(12) United States Patent
Discekici et al.

(10) Patent No.: US 11,752,692 B2
(45) Date of Patent: Sep. 12, 2023

(54) THREE-DIMENSIONAL PRINTING WITH PHOSPHORESCENT PIGMENTS

(71) Applicant: Hewlett-Packard Development Company, L.P., Spring, TX (US)

(72) Inventors: Emre Hiro Discekici, San Diego, CA (US); Alexey S. Kabalnov, San Diego, CA (US); Graciela Emma Negri Jimenez, San Diego, CA (US); Shannon Reuben Woodruff, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/637,478

(22) PCT Filed: Oct. 22, 2019

(86) PCT No.: PCT/US2019/057321
§ 371 (c)(1),
(2) Date: Feb. 23, 2022

(87) PCT Pub. No.: WO2021/080563
PCT Pub. Date: Apr. 29, 2021

(65) Prior Publication Data
US 2022/0274329 A1    Sep. 1, 2022

(51) Int. Cl.
*B29C 64/165* (2017.01)
*B33Y 10/00* (2015.01)
(Continued)

(52) U.S. Cl.
CPC ............ *B29C 64/165* (2017.08); *B22F 10/16* (2021.01); *B22F 1/054* (2022.01); *B22F 1/056* (2022.01);
(Continued)

(58) Field of Classification Search
CPC ....... B29C 64/165; B33Y 10/00; B33Y 30/00; B33Y 70/00; B33Y 70/10
See application file for complete search history.

(56) References Cited

U.S. PATENT DOCUMENTS 5,424,006 A    6/1995  Murayama et al.
6,123,871 A    9/2000  Carroll
(Continued)

FOREIGN PATENT DOCUMENTS

CN    1488790 A    4/2004
FR    2909096 A1   5/2008
(Continued)

*Primary Examiner* — Mary F Theisen
(74) *Attorney, Agent, or Firm* — HP Inc. Patent Department

(57) ABSTRACT

This disclosure describes three-dimensional printing kits, methods, and systems for three-dimensional printing with phosphorescent pigments. In one example, a three-dimensional printing kit can include a powder bed material and a low-tint fusing agent. The powder bed material can include polymer particles and phosphorescent pigment particles mixed with the polymer particles. The low-tint fusing agent can include water and an electromagnetic radiation absorber. The electromagnetic radiation absorber can absorb radiation energy and convert the absorbed radiation energy to heat.

12 Claims, 4 Drawing Sheets

(51) Int. Cl.
  *B33Y 30/00* (2015.01)
  *B33Y 70/10* (2020.01)
  *B22F 10/16* (2021.01)
  *B29K 505/02* (2006.01)
  *B29K 505/14* (2006.01)
  *B22F 12/13* (2021.01)
  *B22F 1/054* (2022.01)

(52) U.S. Cl.
  CPC ........... *B22F 12/13* (2021.01); *B29K 2505/02* (2013.01); *B29K 2505/14* (2013.01); *B29K 2995/0003* (2013.01); *B33Y 10/00* (2014.12); *B33Y 30/00* (2014.12); *B33Y 70/10* (2020.01)

(56) References Cited

U.S. PATENT DOCUMENTS

| | | | |
|---|---|---|---|
| 6,375,864 | B1 | 4/2002 | Phillips et al. |
| 2004/0232583 | A1* | 11/2004 | Monsheimer .......... B33Y 30/00 |
| | | | 425/375 |
| 2017/0145155 | A1* | 5/2017 | Wright ...................... B32B 5/16 |
| 2019/0358898 | A1* | 11/2019 | Kaltenrieder .......... B33Y 10/00 |
| 2022/0402205 | A1* | 12/2022 | Hinch .................... B33Y 10/00 |

FOREIGN PATENT DOCUMENTS

| | | |
|---|---|---|
| WO | 2017/189306 A1 | 11/2017 |
| WO | 2018/194609 A1 | 10/2018 |

* cited by examiner

THREE-DIMENSIONAL PRINTING WITH PHOSPHORESCENT PIGMENTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
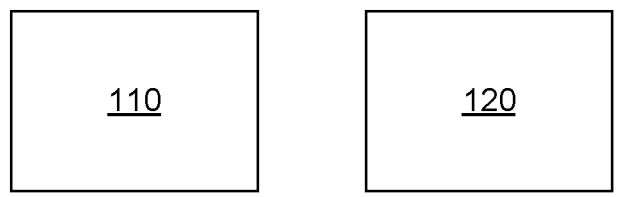
FIG. 1 is a schematic view of an example three-dimensional printing kit in accordance with examples of the present disclosure.

The present disclosure describes three-dimensional printing kits, methods, and systems that can be used to make phosphorescent three-dimensional printed objects. A phosphorescent pigment can be mixed into the powder bed material, so that three-dimensional printed objects made from the powder bed material can have phosphorescent, or "glow in the dark," properties. In one example, a three-dimensional printing kit includes a powder bed material and a low-tint fusing agent. The powder bed material includes polymer particles and phosphorescent pigment particles mixed with the polymer particles. The low-tint fusing agent includes water and an electromagnetic radiation absorber. The electromagnetic radiation absorber absorbs radiation energy and converts the absorbed radiation energy to heat. In other examples, the electromagnetic radiation absorber can absorb the radiation at a wavelength from about 800 nm to about 4,000 nm, and the electromagnetic radiation absorber can be transparent or white at wavelengths ranging from about 400 nm to about 780 nm. In further examples, the electromagnetic radiation absorber can include an inorganic pigment selected from lanthanum hexaborides, tungsten bronzes, indium tin oxides, aluminum zinc oxides, ruthenium oxides, silver, gold, platinum, iron pyroxenes, iron phosphates, copper pyrophosphates, or a combination thereof. In other examples, the three-dimensional printing kit can also include a coloring agent. The coloring agent can include water and a colorant. The colorant can absorb light emitted from the phosphorescent pigment particles. In certain examples, the colorant can be a black pigment, a black dye, or a combination thereof. In some examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. In some other examples, the phosphorescent pigment particles can include calcium sulfide, calcium sulfide doped with bismuth, calcium strontium sulfide, calcium strontium sulfide doped with bismuth, calcium aluminate, calcium aluminate doped with europium, strontium calcium aluminate, zinc sulfide, zinc sulfide doped with copper, zinc cadmium sulfide, zinc cadmium sulfide doped with copper, strontium aluminate, strontium aluminate doped with europium, strontium aluminate doped with europium and dysprosium, barium aluminate, barium aluminate doped with europium, or a combination thereof. In certain examples, the phosphorescent pigment particles can be present in the powder bed material in an amount from about 0.1 wt % to about 10 wt % with respect to the total weight of the powder bed material.

The present disclosure also describes methods of making three-dimensional printed objects. In one example, a method of making a three-dimensional printed object includes iteratively applying individual layers of a powder bed material to a powder bed. The powder bed material includes polymer particles and phosphorescent pigment particles mixed with the polymer particles. A low-tint fusing agent is selectively applied onto the individual layers of powder bed material based on a three-dimensional object model. The low-tint fusing agent includes water and an electromagnetic energy absorber that absorbs radiation energy and converts the radiation energy to heat. The powder bed is exposed to radiation energy to selectively fuse the polymer particles in contact with the electromagnetic radiation absorber at individual layers, thereby forming the three-dimensional printed object. In further examples, a coloring agent can be selectively applied onto a portion of the individual layers of powder bed material to reduce phosphorescence of the phosphorescent pigment in the portion. The coloring agent can include water and a colorant. The colorant can absorb light emitted from the phosphorescent pigment particles. In certain examples, the colorant can be a black pigment, a black dye, or a combination thereof. In other examples, the phosphorescent pigment particles can include calcium sulfide, calcium sulfide doped with bismuth, calcium strontium sulfide, calcium strontium sulfide doped with bismuth, calcium aluminate, calcium aluminate doped with europium, strontium calcium aluminate, zinc sulfide, zinc sulfide doped with copper, zinc cadmium sulfide, zinc cadmium sulfide doped with copper, strontium aluminate, strontium aluminate doped with europium, strontium aluminate doped with europium and dysprosium, barium aluminate, barium aluminate doped with europium, or a combination thereof.

The present disclosure also describes systems for three-dimensional printing. In one example, a system for three-dimensional printing includes a powder bed material, a low-tint fusing agent, and a radiant energy source. The powder bed material includes polymer particles and phosphorescent pigment particles mixed with the polymer particles. The low-tint fusing agent is to selectively apply to a layer of the powder bed material, and the low-tint fusing agent includes water and an electromagnetic radiation absorber that absorbs radiation energy and converts the absorbed radiation energy to heat. The radiant energy source is positioned to expose the layer of powder bed material to radiation energy to selectively fuse the polymer particles in contact with the electromagnetic radiation absorber and thereby form a three-dimensional printed object. In some examples, the phosphorescent pigment particles can include calcium sulfide, calcium sulfide doped with bismuth, calcium strontium sulfide, calcium strontium sulfide doped with bismuth, calcium aluminate, calcium aluminate doped with europium, strontium calcium aluminate, zinc sulfide, zinc sulfide doped with copper, zinc cadmium sulfide, zinc cadmium sulfide doped with copper, strontium aluminate, strontium aluminate doped with europium, strontium aluminate doped with europium and dysprosium, barium aluminate, barium aluminate doped with europium, or a combination thereof. In further examples, the system can also include a coloring agent to selectively apply to a portion of the layer of the powder bed material. The coloring agent can include water and a colorant, wherein the colorant absorbs light emitted from the phosphorescent pigment particles.

It is noted that when discussing the three-dimensional printing kits, methods, and systems herein, these discussions can be considered applicable to one another whether or not they are explicitly discussed in the context of that example. Thus, for example, when discussing a fusing agent related to a three-dimensional printing kit, such disclosure is also relevant to and directly supported in the context of methods and systems, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Three-Dimensional Printing Kits

As mentioned above, the three-dimensional printing kits, methods, and systems described herein can be used to make phosphorescent three-dimensional printed objects, which may sometimes be referred to as three-dimensional printed articles. In some examples, the entire three-dimensional printed object can be phosphorescent. This can be due to the phosphorescent pigment that is initially mixed with the polymer particles in the powder bed material. The phosphorescent pigment particles can become locked in place within the three-dimensional printed object when the polymer particles fuse together to form a solid polymer matrix. Accordingly, the phosphorescent pigment can impart phosphorescent properties throughout the three-dimensional printed object. As used herein, "phosphorescent" refers to the property of emitting light after exposure to radiation. The light emission may not be produced by flame or high temperature (i.e., as in incandescence), but rather by the movement of electrons from an excited energy state to a lower energy state. Phosphorescent materials can be exposed to radiation, such as UV radiation, to excite electrons in the material to an excited energy state. The energy can be released in the form of photons as the electrons return to a lower energy state over a period of time. Phosphorescence is similar to fluorescence, except that phosphorescence occurs over a much longer time scale. For example, a phosphorescent material can continue to emit light for minutes or hours after the exciting radiation is removed, whereas fluorescent materials usually stop emitting light as soon as the exciting radiation is removed. Thus, phosphorescent materials can "store" light energy for a longer time and release the energy slowly after the source of radiation energy has been turned off or removed.

In some examples, the three-dimensional printed objects or articles produced as described herein can have phosphorescent properties throughout the entire object. In other examples, the three-dimensional printed objects can be formed with phosphorescent portions and non-phosphorescent portions. A coloring agent can be used during the three-dimensional printing process to mask certain portions of the three-dimensional printed object. The coloring agent can include a colorant that can absorb light emitted from the phosphorescent pigment particles. The colorant can also block light from reaching the phosphorescent pigment particles to "charge" the particles (i.e., excite electrons in the phosphorescent material to a higher energy state). Thus, the portions of the three-dimensional printed object where the coloring agent is included can be non-phosphorescent. The coloring agent can be selectively applied to the powder bed material with high resolution during three-dimensional printing. Therefore, highly detailed and customizable non-phosphorescent patterns or images can be formed in the three-dimensional printed object. When the three-dimensional printed object is exposed to light, the phosphorescent portions of the object can glow while the non-phosphorescent portions can remain dark.

The three-dimensional printing processes described herein can include applying a fusing agent to a powder bed material that includes polymer particles and the phosphorescent pigment. The fusing agent can include a radiation absorber, which can be a compound or material that absorbs radiation energy (such as UV or infrared radiation) and converts the energy to heat. A coloring agent can also be applied in areas that are desired to be non-phosphorescent. After applying the fusing agent, and radiation source is used to irradiate the powder bed. The areas of the powder bed where the fusing agent was applied can be selectively heated to a melting or softening point temperature of the polymer particles so that the polymer particles fuse together to form a solid layer of the final three-dimensional printed object or article. The fusing agent and the coloring agent can both be applied selectively at a high resolution, allowing for the three-dimensional printed object itself to have a detailed form, and to have detailed non-phosphorescent and phosphorescent patterns in the three-dimensional printed object.

Three-dimensional printed objects with phosphorescent properties can be used in a variety of applications, such as safety devices, emergency signage, camping equipment, fishing lures, phosphorescent clocks and watches, toys, and so on. The phosphorescent pigments described herein can be particularly suited for the three-dimensional printing processes described herein, because the phosphorescent pigments can be inorganic compounds that can easily withstand the elevated temperatures used when fusing the polymer particles together. Thus, the phosphorescent pigment particles can retain their phosphorescent properties throughout the three-dimensional printing process and after.

With this description in mind, the present disclosure describes three-dimensional printing kits that include materials for three-dimensional printing phosphorescent objects. These three-dimensional printing kits can include a powder bed build material including polymer particles and phosphorescent pigment particles mixed with the polymer particles, and a low-tint fusing agent. The low-tint fusing agent can include water and an electromagnetic radiation absorber. The electromagnetic radiation absorber can absorb radiation energy and convert the absorbed radiation energy to heat.

FIG. 1 is a schematic of one example three-dimensional printing kit 100. This three-dimensional printing kit includes a powder bed material 110 and a low-tint fusing agent 120. The powder bed material can include polymer particles and phosphorescent pigment particles mixed with the polymer particles. The low-tint fusing agent can be selectively applied to the powder bed material. The low-tint fusing agent can include water and an electromagnetic radiation absorber. The electromagnetic radiation absorber can absorb radiation energy and convert the radiation energy to heat.

Figure 2:
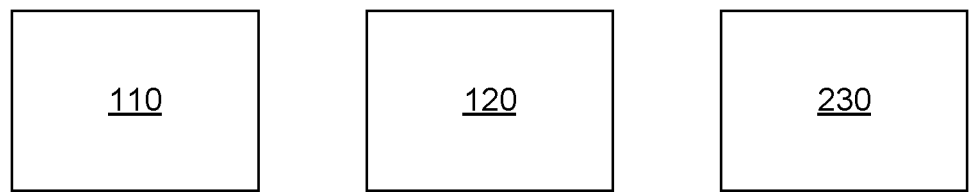
FIG. 2 is a schematic view of another example three-dimensional printing kit in accordance with examples of the present disclosure.

Another example is shown in FIG. 2. This figure shows an example three-dimensional printing kit 200 that includes a powder bed material 110, a low-tint fusing agent 120, and a coloring agent 230. The low-tint fusing agent and the coloring agent can be selectively applied to the powder bed material. The powder bed material can include polymer particles and phosphorescent pigment particles as in the example of FIG. 1. The low-tint fusing agent can also include the same ingredients as in the example of FIG. 1. The coloring agent can include water and a colorant. The colorant can absorb light emitted from the phosphorescent pigment particles. In some examples, the colorant can be a black dye or black pigment, although other colors besides black can also be used. The coloring agent can be selectively applied to the powder bed material in areas that are desired to be non-phosphorescent in the final three-dimensional printed object.

Figure 3A:
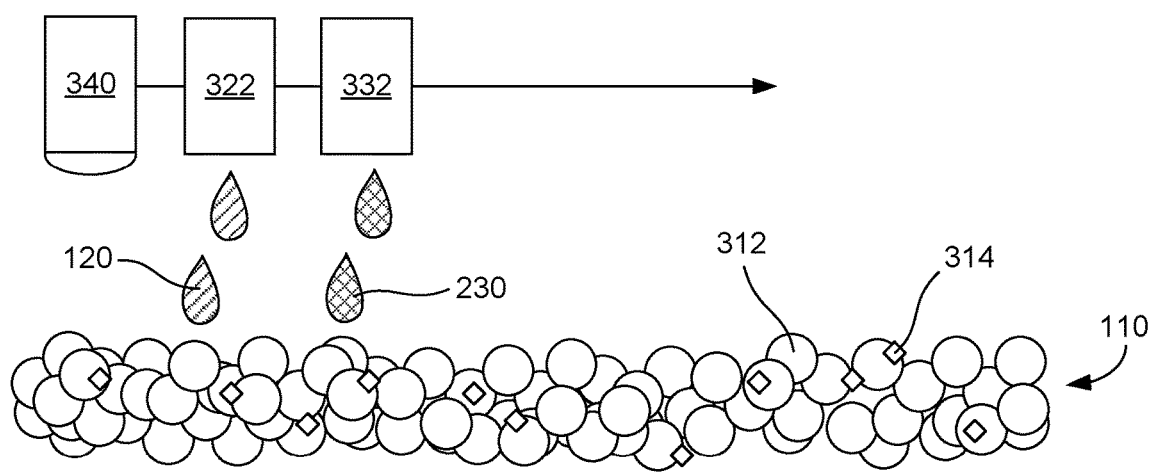
FIGS. 3A-3C show a schematic view of an example three-dimensional printing process using an example three-dimensional printing kit in accordance with examples of the present disclosure.
Figure 3B:
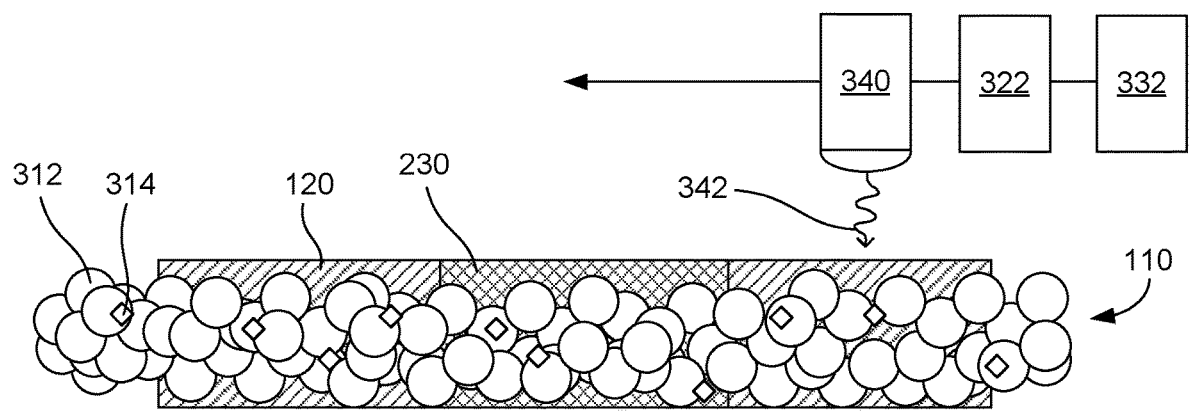
Figure 3C:
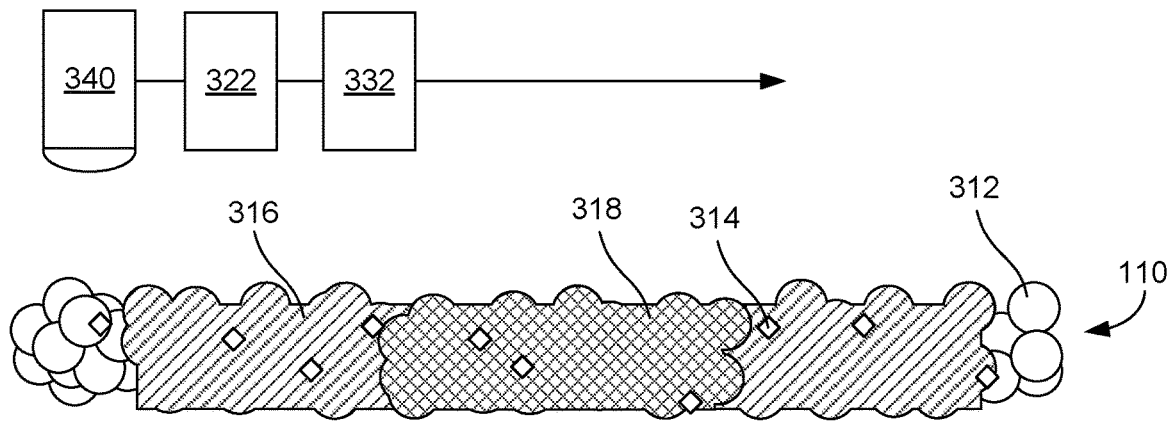

FIGS. 3A-3C illustrate one example of using the three-dimensional printing kits to form a three-dimensional printed object. In FIG. 3A, a low-tint fusing agent 120 and a coloring agent 230 are jetted onto a layer of powder bed material 110 made up of polymer particles 312 and phosphorescent pigment particles 314 mixed with the polymer particles. The low-ting fusing agent is jetted from a fusing agent ejector 322 and the coloring agent is jetted from a coloring agent ejector 332. These fluid ejectors can move across the layer of powder bed material to selectively jet fusing agent on areas that are to be fused, while the detailing agent can be jetted onto areas that are to be cooled. In some cases, the detailing agent can be jetted around edges of the area where the fusing agent was jetted to prevent the surrounding powder bed material from caking. In other examples, the detailing agent can be jetted onto a portion of the same area where the fusing agent was jetted to prevent overheating of the powder bed material. A radiation source 340 can also move across the layer of powder bed material.

FIG. 3B shows the layer of powder bed material after the low-tint fusing agent 120 has been jetted onto an area of the layer that is to be fused. Additionally, the coloring agent 130 has been jetted onto areas of the powder bed that are to be non-phosphorescent. In this figure, the radiation source 340 is shown emitting radiation 342 toward the layer of polymer particles 312 and phosphorescent pigment particles 314. The fusing agent can include a radiation absorber that can absorb this radiation and convert the radiation energy to heat.

FIG. 3C shows the layer of powder bed material with a fused portion 316 where the fusing agent was jetted. This portion has reached a sufficient temperature to fuse the polymer particles together to form a solid polymer matrix. The fused portion has phosphorescent pigment particles 314 trapped within which can impart phosphorescent properties to the final three-dimensional printed object. The coloring agent was jetted onto a portion of the area where the fusing agent was jetted. This portion becomes a non-phosphorescent portion 318 within the fused portion.

Methods of Making Three-Dimensional Printed Objects

Figure 4:
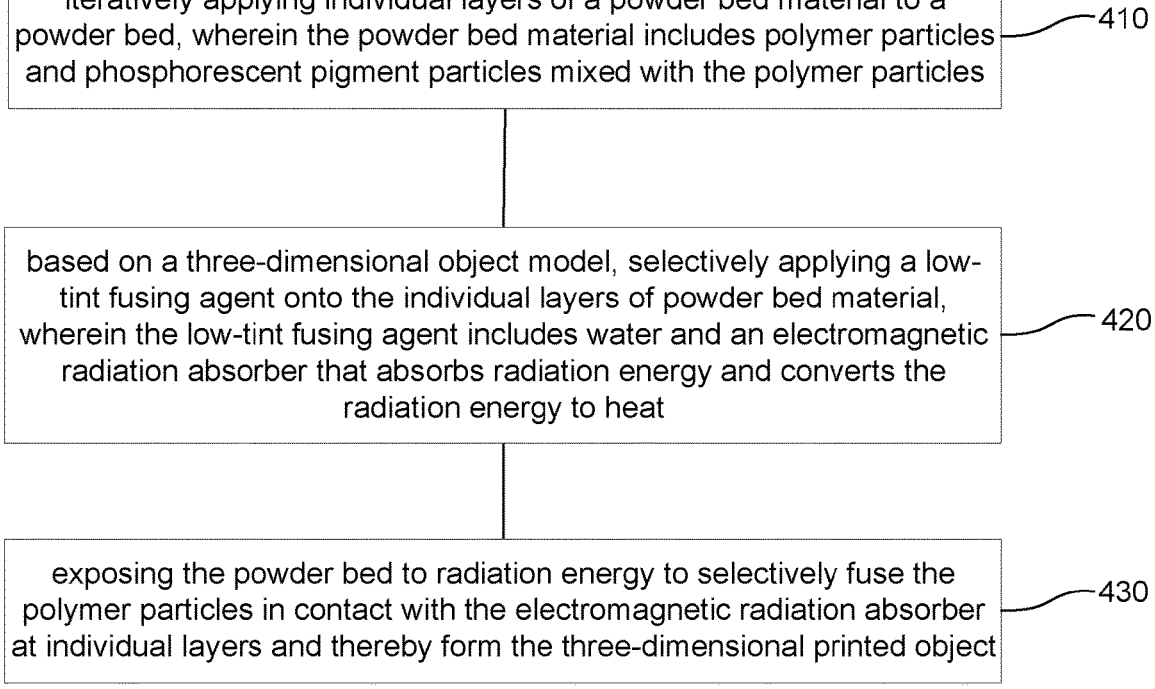
FIG. 4 is a flowchart illustrating an example method of making a three-dimensional printed object in accordance with examples of the present disclosure.

The present disclosure also describes methods of making three-dimensional printed objects. FIG. 4 shows a flowchart illustrating one example method 400 of making a three-dimensional printed object. The method includes: iteratively applying individual layers of a powder bed material to a powder bed, wherein the powder bed material includes polymer particles and phosphorescent pigment particles mixed with the polymer particles 410; based on a three-dimensional object model, selectively applying a low-tint fusing agent onto the individual layers of powder bed material, wherein the low-tint fusing agent includes water and an electromagnetic radiation absorber that absorbs radiation energy and converts the radiation energy to heat 420; and exposing the powder bed to radiation energy to selectively fuse the polymer particles in contact with the electromagnetic radiation absorber at individual layers and thereby form the three-dimensional printed object 430. The powder bed material and low-tint fusing agent can have any of the ingredients and properties described above.

In some examples, a coloring agent can also be applied onto a portion of the powder bed. The coloring agent can reduce the phosphorescence of the phosphorescent pigment in the portion where the coloring agent is applied. The coloring agent can include water and a colorant that absorbs light emitted from the phosphorescent pigment particles. In some examples, the colorant can be a black pigment or a black dye. In certain examples, the colorant can absorb most or all of the light emitted from the phosphorescent pigment particles so that the portion where the coloring agent is applied is non-phosphorescent.

The low-tint fusing agent and coloring agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if the layers of polymer powder are 100 microns thick, then the fusing agent can penetrate 100 microns into the polymer powder. Thus, the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce the printed layer. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate a layer from about 0.5 to about 10 seconds per pass.

The three-dimensional printed object can be formed by jetting a fusing agent onto layers of powder bed build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. In certain examples, the three-dimensional object model can define the three-dimensional shape of the object and the three-dimensional shape of areas of the powder bed to be jetted with detailing agent. In other examples, the object can be defined by a first three-dimensional object model a second three-dimensional object model can define areas to jet the detailing agent. In further examples, jetting of the detailing agent may not be controlled using a three-dimensional object model, as it could be controlled using some other parameters or instructions to the three-dimensional printing system. Other information may also be included in three-dimensional object models, such as the shape of portions where a coloring agent is to be applied to reduce phosphorescence of the phosphorescent pigment. The three-dimensional object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the three-dimensional printed object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional printed object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying individual build material layers of polymer particles to a powder bed" also includes spreading layers of polymer particles over the loose particles and fused layers beneath the new layer of polymer particles.

Systems for Three-Dimensional Printing

Figure 5:
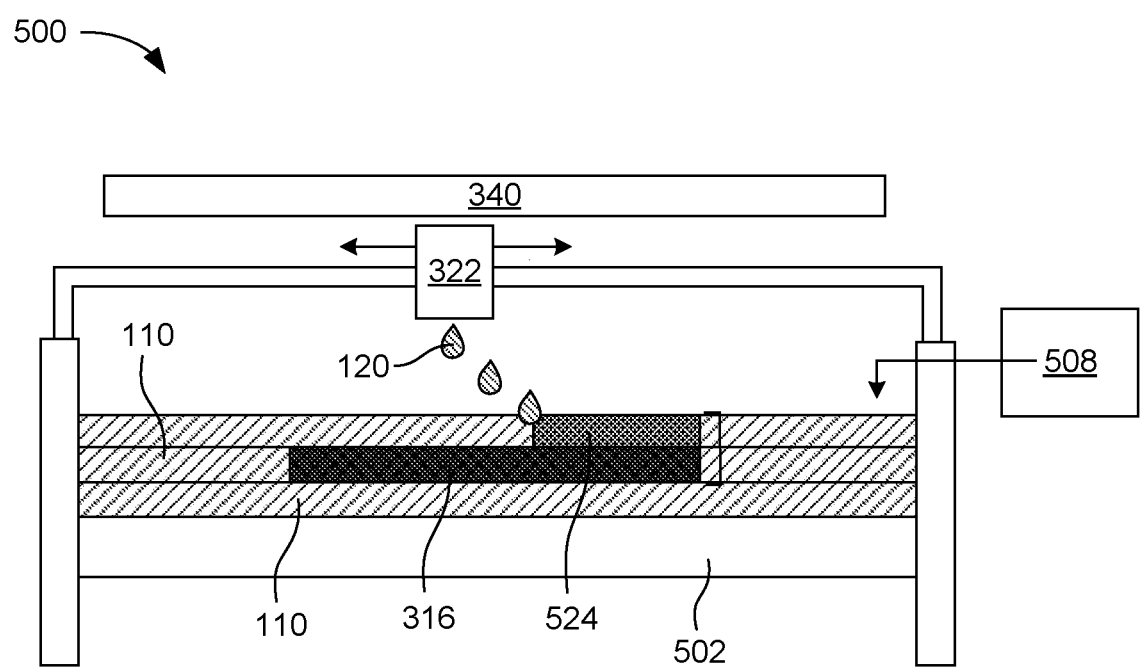
FIG. 5 is a schematic view of an example system for three-dimensional printing in accordance with examples of the present disclosure.

The present disclosure also extends to systems for three-dimensional printing. The systems can include the powder bed material and the low-tint fusing agent described above. The systems can also include a radiant energy source positioned to expose the powder bed material to radiation to selectively fuse the polymer particles in contact with the radiation absorber from the fusing agent. In some examples, the powder bed material can be distributed in individual layers by a build material applicator, and the fusing agent can be jetted onto the layers by a fluid ejector. FIG. 5 shows an example system 500 for three-dimensional printing in accordance with the present disclosure. The system includes a build platform 502. Powder bed material 110 can be deposited onto the build platform by a build material applicator 508 where the powder bed material can be flattened or smoothed, such as by a mechanical roller or other flattening technique. This can form a flat layer of powder bed material. The low-tint fusing agent 120 can then be applied to the layer by a fusing agent ejector 322. The area 524 where the fusing agent is applied can correspond to a layer or slice of a three-dimensional object model. The system can include a radiant energy source 340 that can apply heat to the layers of powder bed material and fusing agent that has been applied. In this particular example, the system includes a radiant energy source that can irradiate the entire powder bed at once instead of a moveable radiant energy source that moves across the powder bed. The radiant energy source can heat the powder bed material and fusing agent until the powder bed material on which the fusing agent was printed reaches a melting or softening point temperature of the powder bed material. The polymer particles can fuse together to form a solid polymer matrix 316. In this figure, one layer of solid polymer matrix has already been formed and then a layer of additional powder bed material has been spread over the top of the solid layer. The figure shows the fusing agent being applied to the additional layer, which can then subsequently bed heated and fused to add another solid layer to the three-dimensional printed object.

As used herein, "applying individual layers of powder bed material to a powder bed" can include applying the first layer of powder bed material that is applied directly to an empty support bed. The "support bed" can refer to the build platform, as shown in FIG. 5, for example. Additionally, in some examples, a layer or multiple layers of powder bed material can be laid on the support bed without jetting any fusing agent onto the layers. This can provide a more thermally uniform temperature profile for the first layer to have the fusing agent jetted thereon. Accordingly, "applying individual layers of a powder bed material to a powder bed" can include applying a layer of powder bed material onto the initial layer or layers that may be applied without any fusing agent. The phrase "applying individual layers of a powder bed material to a powder bed" also includes applying to subsequent layers, when a layer or slice of the three-dimensional printed object has already been formed in the layer below.

In further examples, the system can include a radiant energy source. The radiant energy source can be positioned above the powder bed material as in FIG. 5, or in other examples the heater can be on a side or sides of the powder bed material, or a combination of these locations. In some examples, the support bed can include an additional integrated heater to heat the powder bed material from below to maintain a more uniform temperature in the powder bed. The radiant energy source can be used to heat the areas of the powder bed where fusing agent has been applied to fuse the polymer particles in those areas. In certain examples, the radiant energy source heater can include a heat lamp, infrared heater, halogen lamp, fluorescent lamp, or other type of radiant energy source. In further examples, the radiant energy source can be mounted on a carriage to move across the powder bed. In certain examples, the fusing agent ejector and the radiant energy source can both be mounted on a carriage to move across the powder bed. For example, the fusing agent can be jetted from the fusing agent ejector on a forward pass of the carriage, and the radiant energy source can be activated to irradiate the powder bed on a return pass of the carriage. A coloring agent ejector and any other fluid ejectors in the system can also be mounted on the carriage.

Powder Bed Materials

The powder bed material can include polymer particles and phosphorescent pigment particles. In certain examples, the powder bed material can include polymer particles having a variety of shapes, such as substantially spherical particles or irregularly-shaped particles. In some examples, the polymer powder can be capable of being formed into three-dimensional printed objects with a resolution of about 20 µm to about 100 µm, about 30 µm to about 90 µm, or about 40 µm to about 80 µm. As used herein, "resolution" refers to the size of the smallest feature that can be formed on a three-dimensional printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 6,12 powder, thermoplastic polyamide powder, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be a polyamide copolymer.

The phosphorescent pigment particles can be any particulate material having phosphorescent properties. In some examples, the phosphorescent pigment can be an inorganic pigment. Some phosphorescent pigments can include metal sulfides or metal oxides. Certain examples can include aluminates. In some examples, the phosphorescent pigment can include an aluminate or a sulfide of an alkaline earth metal. In further examples, the phosphorescent pigment can include an additional metal dopant present in small quantities (such as less than 5 wt % or less than 1 wt %).

In certain examples, the phosphorescent pigment can include calcium sulfide, calcium sulfide doped with bismuth, calcium strontium sulfide, calcium strontium sulfide doped with bismuth, calcium aluminate, calcium aluminate doped with europium, strontium calcium aluminate, zinc sulfide, zinc sulfide doped with copper, zinc cadmium sulfide, zinc cadmium sulfide doped with copper, strontium aluminate, strontium aluminate doped with europium, strontium aluminate doped with europium and dysprosium, barium aluminate, barium aluminate doped with europium, or a combination thereof.

The amount of phosphorescent pigment added to the polymer particles in the powder bed material can be adjusted depending on the level of phosphorescence desired for the final three-dimensional printed object. Any amount of the phosphorescent pigment can be added as long as the polymer powder is able to fuse together to form a three-dimensional printed object. In some examples, the amount of phosphorescent pigment can be such that the powder bed material can be interchangeable with a pure polymer particle powder bed material in the three-dimensional printing process. That is, the powder bed material that includes the phosphorescent pigment can functional the same in the three-dimensional printing process as a powder bed material that does not include the phosphorescent pigment. Therefore, three-dimensional printed objects can be made using the same printing parameters (i.e., "print mode") when the powder bed includes phosphorescent pigment as when the powder bed material is pure polymer particles. In certain examples, the phosphorescent pigment particles can be present in an amount from about 0.1 wt % to about 10 wt % with respect to the total weight of the powder bed material. In further examples, the phosphorescent pigment particles can be present in an amount from about 0.5 wt % to about 6 wt % or from about 1 wt % to about 4 wt %.

The phosphorescent pigment particles can be mixed with the polymer particles by a variety of mixing methods. In one example, the phosphorescent pigment particles can be dry blended with the polymer particles. In further examples, the phosphorescent pigment can be mixed with the polymer particles without milling the phosphorescent pigment. In some cases, milling the phosphorescent pigment particles may result in a reduction of the phosphorescent properties of the pigment.

The powder bed material can also in some cases include a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The three-dimensional printing kits, methods, and systems described herein can include a fusing agent to be applied to the powder bed build material. As mentioned above, the fusing agent can be a low-tint fusing agent in some examples. Using a low tint fusing agent can allow the light emitted from the phosphorescent pigment to shine through the polymer of the three-dimensional printed object, making the three-dimensional printed object glow. In further examples, multiple fusing agents can be used in a single three-dimensional printing process. For example, a low-tint fusing agent can be used together with a black fusing agent. Black fusing agents can include a black pigment as the radiation absorber. In some examples, a black fusing agent can be used to print a core portion of the three-dimensional printed object. An outer layer of the three-dimensional printed object can be formed using the low-tint fusing agent. In this way, the object can have the appearance of being made with the low-tint fusing agent, but a significant portion of the interior volume of the object can actually be made using the black fusing agent.

As mentioned, the electromagnetic radiation absorber can absorb and convert electromagnetic energy to thermal energy. In one example, the electromagnetic radiation absorber can absorb radiation energy at a wavelength from about 800 nm to about 4,000 nm. As used herein, "absorb" means that 80% or more of the radiation having wavelengths from about 800 nm to about 4,000 nm is absorbed. When used with a light source that emits a wavelength in this range the electromagnetic radiation absorber can cause a polymeric powder bed material in contact therewith, to melt and coalesce without melting the polymeric powder bed material that is not in contact with the low tint fusing agent. In accordance with the "low tint" aspect of the low tint fusing agent, the electromagnetic radiation absorber can be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

In some examples, the electromagnetic radiation absorber of the low tint fusing agent can include an inorganic pigment. The inorganic pigment can include lanthanum hexaborides, tungsten bronzes, indium tin oxides, aluminum zinc oxides, ruthenium oxides, silver, gold, platinum, iron pyroxenes, iron phosphates, copper pyrophosphates, or a combination thereof. In an example, the electromagnetic radiation absorber can include a tungsten bronze. The tungsten bronze can be an alkali doped tungsten oxide. The alkali dopant can be included from greater than 0 mol % to about 0.33 mol % cesium, sodium, potassium, rubidium, or a combination thereof. In another example, the electromagnetic radiation absorber can include a modified iron phosphate having a formula $A_xFe_yPO_4$. In an example, the modified iron phosphate can include copper iron phosphate where A is Cu, magnesium iron phosphate where A is Mg, or zinc iron phosphate where A is Zn. In the copper iron phosphate, the magnesium iron phosphate, or the zinc iron phosphate x is 0.1 to 0.5 and y is 0.50 to 0.9. In a further example, the electromagnetic radiation absorber can be a modified copper phosphate having a formula $A_xCu_yP_2O_7$. The modified copper phosphate can include iron copper phosphate where A is Fe, magnesium copper phosphate where A is Mg, or zinc copper phosphate where A is Zn. In the iron copper phosphate, the magnesium copper phosphate, or the zinc copper phosphate x is 0 to 2 and y is 0 to 2.

The electromagnetic radiation absorber can be present in the low tint fusing agent at from about 1 wt % to about 20 wt %. In other examples, the electromagnetic radiation absorber can be present at from about 1 wt % to about 10 wt %, at from about 5 wt % to about 15 wt %, at from 10 wt % to about 20 wt %, or from about 2 wt % to about 12 wt %. Furthermore, the electromagnetic radiation absorber can have an average particle size that can range from about 1 nm to about 250 nm. The term "average particle size" describes a diameter or average diameter, which may vary, depending upon the morphology of the individual particle. In an example, the respective particle can have a substantially spherical morphology. A substantially spherical particle, e.g., spherical or near-spherical) has a sphericity of >0.84. Thus, any individual particles having a sphericity of <0.84 are considered non-spherical (irregularly shaped). The particle size of the substantially spherical particle may be provided by its diameter, and the particle size of a non-spherical particle may be provided by its average diameter, e.g., the average of multiple dimensions across the particle, or by an effective diameter, e.g. the diameter of a sphere with the same mass and density as the non-spherical particle. In yet other examples, the electromagnetic radiation absorber can have an average particle size from about 10 nm to about 200 nm, from about 5 nm to about 75 nm, from about 50 nm to about 150 nm, or from about 80 nm to about 160 nm.

As mentioned above, in some examples the three-dimensional printing kits, methods, and systems described herein can include a low-tint fusing agent, or a combination of a low-tint fusing agent and an additional fusing agent. The fusing agents can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the three-dimensional printed object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of $+_2$, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_5$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, N.J.), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

The ingredients listed above can be included in a low-tint fusing agent in some examples. In further examples, the ingredients listed above can be included in an additional fusing agent or agents, such as black fusing agents.

Coloring Agents

As described above, a coloring agent can be used in the three-dimensional printing kits, methods, and systems described herein. In one example, a three-dimensional printing kit can include a powder bed material, a low-tint fusing agent, and a coloring agent. The coloring agent can include water and a colorant. The colorant can absorb light emitted from the phosphorescent pigment particles. In certain examples, the colorant can be a black pigment, a black dye, or a combination thereof. In other examples, the colorant can be another color besides black.

In further examples, a method of making a three-dimensional printed object can include selectively applying a coloring agent onto a portion of a layer of powder bed material. The coloring agent can reduce the phosphorescence of the phosphorescent pigment in that portion of the powder bed. Without being bound to a specific mechanism, in some examples the coloring agent can include a colorant that absorbs light emitted from the phosphorescent pigment particles, thereby reducing the phosphorescence of the phosphorescent pigment. Additionally, in some examples the colorant can block light from an external light source so that the light cannot reach the phosphorescent pigment particles, thereby preventing the phosphorescent pigment particles from being charged.

As used herein, "reduce the phosphorescence" can refer to reducing the amount of light emitted from an object after irradiating the object with a suitable wavelength of light to charge the phosphorescent pigment. The phosphorescent pigment material itself may not change, and therefore it may be considered to still have the same phosphorescent properties, but the presence of a colorant can reduce the light emitted after charging by absorbing light emitted from the phosphorescent pigment particles, and/or blocking light from reaching the pigment particles to charge the pigment particles.

In another example, a system for three-dimensional printing can include a coloring agent to selectively apply to a portion of a layer of powder bed material. The coloring agent can include the same ingredients described above. In some examples, the system can include a first fluid ejector that can jet a low-tint fusing agent onto the powder bed material, and a second fluid ejector that can jet the coloring agent onto the powder bed material.

In certain examples, the coloring agent can include a black colorant such as a black pigment or a black dye. Examples of black colorants can include the following pigments available from Degussa Corp. (Germany): Color Black FWI, Color Black FW2, Color Black FW2V, Color Black 18, Color Black, FW200, Color Black 5150, Color Black S160, and Color Black 5170. The following black pigments are available from Cabot Corp. (USA): REGAL® 400R, REGAL® 330R, REGAL® 660R, MOGUL® L, BLACK PEARLS® L, MONARCH® 1400, MONARCH® 1300, MONARCH® 1100, MONARCH® 1000, MONARCH® 900, MONARCH® 880, MONARCH® 800, and MONARCH® 700. The following pigments are available from Orion Engineered Carbons GMBH (Germany): PRINTEX® U, PRINTEX® V, PRINTEX® 140U, PRINTEX® 140V, PRINTEX® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigments are available from Birla Carbon (USA): RAVEN® 7000, RAVEN® 5750, RAVEN® 5250, RAVEN® 5000 Ultra® II, RAVEN® 2000, RAVEN® 1500, RAVEN® 1250, RAVEN® 1200, RAVEN® 1190 Ultra®. RAVEN® 1170, RAVEN® 1255, RAVEN® 1080, and RAVEN® 1060. Examples of black dyes that can be used can include the C.I. Direct series of black dyes. Other black pigments and dyes can also be included in the coloring agent.

In further examples, other colors of pigment and/or dye can be used in the coloring agent. Suitable pigments can include the following, which are available from BASF Corp. (Germany): PALIOGEN® Orange, HELIOGEN® Blue L 6901F, HELIOGEN® Blue NBD 7010, HELIOGEN® Blue K 7090, HELIOGEN® Blue L 7101F, PALIOGEN® Blue L 6470, HELIOGEN® Green K 8683, HELIOGEN® Green L 9140, CHROMOPHTAL® Yellow 3G, CHROMOPHTAL® Yellow GR, CHROMOPHTAL® Yellow 8G, IGRAZIN® Yellow SGT, and IGRALITE® Rubine 4BL. The following pigment is available from DuPont: TI-PURE® R-101. The following pigments are available from Heubach (Germany): MONASTRAL® Magenta, MONASTRAL® Scarlet, MONASTRAL® Violet R, MONASTRAL® Red B, and MONASTRAL® Violet Maroon B. The following pigments are available from Clariant (Switzerland): DALAMAR® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM® Yellow HR, NOVOPERM® Yellow FGL, Hansa Brilliant Yellow 10GX, Permanent Yellow G3R-01, HOSTAPERM® Yellow H4G, HOSTAPERM® Yellow H3G, HOSTAPERM® Orange GR, HOSTAPERM® Scarlet GO, and Permanent Rubine F6B. The following pigments are available from Sun Chemical (USA): QUINDO® Magenta, INDOFAST® Brilliant Scarlet, QUINDO® Red R6700, QUINDO® Red R6713, INDOFAST® Violet, L74-1357 Yellow, L75-1331 Yellow, and L75-2577 Yellow. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide. Specific examples of a cyan colour pigment may include C.I. Pigment Blue-1, -2, -3, -15, -15:1,-15:2, -15:3, -15:4, -16, -22, and -60. Specific examples of a magenta colour pigment may include C.I. Pigment Red-5, -7, -12, -48, -48:1, -57, -112, -122, -123, -146, -168, -177, -184, -202, and C.I. Pigment Violet-19. Specific examples of a yellow pigment may include C.I. Pigment Yellow-1, -2, -3, -12, -13, -14, -16, -17, -73, -74, -75, -83, -93, -95, -97, -98, -114, -128, -129, -138, -151, -154, and -180.

The colorant can be included in the coloring agent at various concentrations, depend on the desired amount of reduction of phosphorescence of the phosphorescent pigment. In some examples, the coloring agent can include the colorant in an amount from about 0.1 wt % to about 10 wt %, or from about 0.5 wt % to about 5 wt %, or from about 1 wt % to about 5 wt %.

The coloring agent can also include ingredients to allow the coloring agent to be jetted by a fluid jet printhead. In some examples, the coloring agent can include jettability imparting ingredients such as those in the fusing agents described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" can include pigment colorants, magnetic particles, aluminas, silicas, and/or other ceramics, organo-metallics or other opaque particles, whether or not such particulates impart color. Thus, though the present description describes the use of pigment colorants, the term "pigment" can be used to describe pigment colorants, and also other pigments such as organometallics, ferrites, ceramics, etc. In one specific aspect, however, the pigment is a pigment colorant.

As used herein, "charge" when used with respect to "charging" a glow in the dark object or charging phosphorescent pigment particles, means applying electromagnetic radiation that excites electrons in the phosphorescent material to a higher energy state, allowing the energy to be released through phosphorescence to create a glow over time. The term "charge" in this context does not mean that the material is electrically charged or ionized.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though the members of the list are individually identified as separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

Phosphorescent objects were formed using a powder bed material that included polyamide 12 polymer particles dry blended with a phosphorescent pigment. The phosphorescent pigment was strontium aluminate ($SrAl_2O_4$) doped with europium and dysprosium. The phosphorescent pigment was chargeable with ultraviolet (UV) light and glowed for a period of time with a green color. The powder bed material included 2.5 wt % of the phosphorescent pigment with the remainder being polyamide 12 particles. The powder bed material was loaded in a HP Multi Jet Fusion 3D test printer. The test printer included a fluid ejector that jetted a low-tint fusing agent. The low-tint fusing agent imparted a slight bluish-gray color to the white polyamide 12 powder. Two sample three-dimensional printed objects were formed in the shape of gold tees using these materials.

The three-dimensional printed golf tees were exposed to UV light for a period of a few seconds. The UV light was then removed and the three-dimensional printed golf tees were observed in a dark room. Both samples were found to glow with a green color for a period of time after the UV light was removed. These results show that the powder bed material including the phosphorescent pigment can be used to form three-dimensional printed objects with homogeneous phosphorescent properties. The phosphorescent pigment is able to withstand the conditions of the three-dimensional printing process and retain its phosphorescent properties.

Example 2

Three more sample three-dimensional printed objects were formed with shape of a small solid rectangle. In this example, the Multi Jet Fusion 3D test printer was loaded with the low-tint fusing agent in one fluid ejector, and a black coloring agent in a second fluid ejector. The black coloring agent had a composition as shown in Table 1.

TABLE 1

| Ingredient | Wt % |
| --- | --- |
| Co-solvent | 6-30 |
| Surfactant | 0.5-2 |

TABLE 1-continued

| Ingredient | Wt % |
|---|---|
| Chelator | 0.01-1 |
| Biocide | 0.01-1 |
| Anti-kogation | 0.01-1 |
| Black Dye | 0.5-5 |
| Water | Balance |

Two of the sample three-dimensional printed objects were formed using the powder bed material including 2.5 wt % phosphorescent pigment. Half of the object was formed using the low-tint fusing agent without any black coloring agent. The other half of the object was formed using the low-tint fusing agent, and the black coloring agent was jetted onto the powder bed in areas that formed a thin layer (a few millimeters thick) at the exterior surface of the object. As a control, a third three-dimensional printed object was made using normal polyamide 12 powder, without the phosphorescent pigment.

The three sample three-dimensional printed objects were exposed to UV light for a few seconds and then observed in a dark room. The two samples that were formed with the phosphorescent pigment and which had black coloring agent on half of the surface showed a green glow from the half without the black coloring agent, and no glow from the half with the black coloring agent. The third sample, which was made without the phosphorescent pigment, did not glow at all.

These results show that the black coloring agent can be used to reduce or eliminate the phosphorescent properties of the three-dimensional printed objects. Therefore, any desired custom pattern can be formed by jetting the black coloring agent in areas where phosphorescence is not desired. It is expected that the amount of reduction of the phosphorescent properties (i.e., the brightness of the glow) can be adjusted by using different amounts of black coloring agent or by using coloring agents with different colors other than black.

What is claimed is:

1. A three-dimensional printing kit comprising:
    a powder bed material comprising polymer particles and phosphorescent pigment particles mixed with the polymer particles,
        wherein the phosphorescent pigment particles are selected from the group consisting of calcium sulfide, calcium strontium sulfide, calcium strontium sulfide doped with bismuth, calcium aluminate, calcium aluminate doped with europium, strontium calcium aluminate, zinc sulfide doped with copper, zinc cadmium sulfide, zinc cadmium sulfide doped with copper, strontium aluminate, strontium aluminate doped with europium and dysprosium, barium aluminate, barium aluminate doped with europium, and a combination thereof; and
    a low-tint fusing agent comprising water and an electromagnetic radiation absorber wherein the electromagnetic radiation absorber absorbs radiation energy and converts the absorbed radiation energy to heat.

2. The three-dimensional printing kit of claim 1, wherein the electromagnetic radiation absorber absorbs the radiation at a wavelength from about 800 nm to about 4,000 nm, and wherein the electromagnetic radiation absorber is transparent or white at wavelengths ranging from about 400 nm to about 780 nm.

3. The three-dimensional printing kit of claim 1, wherein the electromagnetic radiation absorber includes an inorganic pigment selected from lanthanum hexaborides, tungsten bronzes, indium tin oxides, aluminum zinc oxides, ruthenium oxides, silver, gold, platinum, iron pyroxenes, iron phosphates, copper pyrophosphates, or a combination thereof.

4. The three-dimensional printing kit of claim 1, further comprising a coloring agent comprising water and a colorant, wherein the colorant absorbs light emitted from the phosphorescent pigment particles.

5. The three-dimensional printing kit of claim 4, wherein the colorant is a black pigment, a black dye, or a combination thereof.

6. The three-dimensional printing kit of claim 1, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof.

7. The three-dimensional printing kit of claim 1, wherein the phosphorescent pigment particles are present in the powder bed material in an amount from about 0.1 wt % to about 10 wt % with respect to the total weight of the powder bed material.

8. A method of making a three-dimensional printed object comprising:
    iteratively applying individual layers of a powder bed material to a powder bed, wherein the powder bed material comprises polymer particles and phosphorescent pigment particles mixed with the polymer particles,
        wherein the phosphorescent pigment particles are selected from the group consisting of calcium sulfide, calcium strontium sulfide, calcium strontium sulfide doped with bismuth, calcium aluminate, calcium aluminate doped with europium, strontium calcium aluminate, zinc sulfide doped with copper, zinc cadmium sulfide, zinc cadmium sulfide doped with copper, strontium aluminate, strontium aluminate doped with europium and dysprosium, barium aluminate, barium aluminate doped with europium, and a combination thereof;
    based on a three-dimensional object model, selectively applying a low-tint fusing agent onto the individual layers of powder bed material, wherein the low-tint fusing agent comprises water and an electromagnetic radiation absorber that absorbs radiation energy and converts the radiation energy to heat; and
    exposing the powder bed to radiation energy to selectively fuse the polymer particles in contact with the electromagnetic radiation absorber at individual layers and thereby form the three-dimensional printed object.

9. The method of claim 8, further comprising selectively applying a coloring agent onto a portion of the individual layers of powder bed material to reduce phosphorescence of the phosphorescent pigment in the portion, wherein the coloring agent comprises water and a colorant, and wherein the colorant absorbs light emitted from the phosphorescent pigment particles.

10. The method of claim 9, wherein the colorant is a black pigment, a black dye, or a combination thereof.

11. A system for three-dimensional printing comprising:
a powder bed material comprising polymer particles and phosphorescent pigment particles mixed with the polymer particles,
   wherein the phosphorescent pigment particles are selected from the group consisting of calcium sulfide, calcium strontium sulfide, calcium strontium sulfide doped with bismuth, calcium aluminate, calcium aluminate doped with europium, strontium calcium aluminate, zinc sulfide doped with copper, zinc cadmium sulfide, zinc cadmium sulfide doped with copper, strontium aluminate, strontium aluminate doped with europium and dysprosium, barium aluminate, barium aluminate doped with europium, and a combination thereof;
a low-tint fusing agent to selectively apply to a layer of the powder bed material, wherein the fusing agent includes water and an electromagnetic radiation absorber that absorbs radiation energy and converts the absorbed radiation energy to heat; and
a radiant energy source positioned to expose the layer of powder bed material to radiation energy to selectively fuse the polymer particles in contact with the electromagnetic radiation absorber and thereby form a three-dimensional printed object.

12. The system of claim 11, further comprising a coloring agent to selectively apply to a portion of the layer of the powder bed material, the coloring agent comprising water and a colorant, wherein the colorant absorbs light emitted from the phosphorescent pigment particles.

* * * * *